United States Patent [19]

Macrander et al.

[11] 3,917,904

[45] Nov. 4, 1975

[54] VIDEO TELEPHONE SUBSCRIBER INTERFACE CIRCUIT

[75] Inventors: Max S. Macrander, Warrenville; Ronald F. Kowalik, Lombard, both of Ill.

[73] Assignee: GTE Automatic Electric Laboratories Incorporated, Northlake, Ill.

[22] Filed: May 30, 1974

[21] Appl. No.: 474,503

[52] U.S. Cl. .............................................. 179/2 TV

[51] Int. Cl.² .......................................... H04M 11/08

[58] Field of Search ...... 179/2 TV, 2 R, 1 CN, 18 B

[56] References Cited

UNITED STATES PATENTS 3,612,767 10/1971 Anderson et al. ................ 179/2 TV

*Primary Examiner*—Kathleen H. Claffy
*Assistant Examiner*—Thomas D'Amico
*Attorney, Agent, or Firm*—James V. Lapacek

[57] ABSTRACT

A telephone system which provides for either audio or audio-video communication has an audio network for carrying the audio communication and an audio-video network for carrying the audio-video communication. The audio and audio-video networks are automatically selected for accommodating the desired form of communication responsive to dial codes generated by a dial code generator, therebeing a unique dial code for audio-video communication. Means responsive to the dial codes establish a pair of voltages having relative magnitudes on the audio portion of the audio-video network and a voltage detector detects the relative levels for deriving conditioning signals to render the audio or audio-video network conditioned for processing the desired communication.

7 Claims, 3 Drawing Figures

VIDEO TELEPHONE SUBSCRIBER INTERFACE CIRCUIT

BACKGROUND OF THE INVENTION

The present invention is generally directed to a communication system for transmitting information of either a first or second form, the system having first and second networks for carrying the first and second forms of communication respectively, and a means for selectively conditioning the first and second networks to accommodate the desired form of communication.

The present invention is more particularly directed to a telephone communication system of the type which provides for both audio or audio-video communication, wherein the system has an audio network for carrying the audio communication and an audio-video network for carrying the audio-video communication and wherein the system includes a means for conditioning either the audio or audio-video networks in response to dial codes.

Telephone communication systems of the type for transmitting audio information are well known. Such systems usually include a plurality of subscribers, each subscriber having a telephone receiver and transmitter for transmitting and receiving audio communication and a dial code generator for dialing the number of another subscriber to be called. The audio communication between a pair of subscribers is generally carried over a switching matrix which includes RING and TIP transmission path pairs, and the individual subscribers are inductively coupled to the RING and TIP transmission path pairs through interface circuits.

Telephone communication systems of the type which provide for both audio and audio-video communication usually include separate networks for processing the audio and audio-video communication. That is to say, such systems include the audio network as mentioned above and additionally includes a separate audio-video network which has an audio portion and a video portion. The audio portion of the audio-video network is generally of the type as used for solely audio communications, in that it includes a switching matrix including RING and TIP transmission path pairs and interface circuits for coupling the subscribers to the audio transmission path pairs. The video portion is substantially similar to the audio portion except for the interface circuits which must be able to accommodate the relatively high frequencies encountered during video communication. Both the audio and the audio-video networks are supervised by the same central office and the audio and audio-video networks are generally configured in parallel arrangement.

Each subscriber which is accommodated for both audio and audio-video service is equipped with a telephone set and a video transmitter for generating both audio and video signals. Inasmuch as the telephone set for generating the audio signals is used for both audio and audio-video communication, such systems require a means for alternately conditioning the telephone system for either audio or audio-video communication. It necessarily follows then that if a subscriber wishes to place an audio call the audio network of the system must be conditioned for carrying the audio communication, and if the subscriber wishes to place an audio-video call, the audio-video network must be conditioned for carrying the audio-video communication.

Any such conditioning must be supervised by the central office so that it can place a busy signal on the subscriber's audio network when he places his audio-video call and alternately must place a busy signal on his audio-video network when he places an audio call.

It is therefore a general object of the present invention to provide a means for conditioning a first or second network for accommodating first and second modes of communication respectively in a communication system.

It is a more particular object of the present invention to provide a means for selectively conditioning the audio and audio-video networks of a telephone communication system which provides for both audio and audio-video communication.

It is a further object of the present invention to provide a means for conditioning the audio and audio-video networks of a telephone communication system which provides for both audio and audio-video communication wherein the conditioning is accomplished before the dialing of the number to be called is completed.

It is a still further object of the present invention to provide a means for conditioning the audio and audio-video networks of a telephone communication system which provides for audio and audio-video communication wherein the conditioning signal processing occurs solely within the audio portion of the audio-video network to thereby simplify the conditioning process.

In general, the present invention provides means for selectively conditioning first and second networks in a communication system for transmitting information in either a first or second form of communication. The first and second networks include a wire pair for carrying the first and second forms of communication respectively. The conditioning means includes a dial code generating means coupled to the first network wire pair for generating first and second dial code signals, the first dial code signal corresponding to the first form of communication and the second dial code signal corresponding to the second form of communication. A voltage level means is coupled to the first network wire pair and is responsive to the dial code for providing the first network wire pair with voltages of first relative levels in response to the first dial code and for providing the first network wire pair with voltages of second relative levels in response to the second dial code. Voltage level detecting means coupled to the first network wire pair detects the first and second relative voltage levels and provides a first network conditioning signal in response to the first relative voltage levels rendering the first network conditioned for carrying the first form of communication and a second network conditioning signal in response to the second relative voltage levels rendering the second network conditioned for carrying the second form of communication. Therefore, the first and second networks are selectively and automatically conditioned to carry the first and second forms of communication respectively.

The present invention also provides in a telephone system of the type which provides for both audio and audio-video communication the improvement of a means for conditioning the system for either audio or audio-video communication in response to dial codes. The system has an audio-video network including an audio crosspoint switching matrix for carrying the audio portion of the audio-video communication, The matrix having current sources for sustaining a transmission path pair between any two endpoints of the system, an audio network for carrying the audio communication and dial code means coupled to at least one end of the crosspoint matrix for generating the dial codes. The dial codes for the audio-video communication are a unique set of characters. Dial code receiving means are coupled to the other end of the crosspoint switching matrix and responsive to the dial codes generated by the dial code means to provide a first set of control signals in response to the unique set of characters and a second set of control signals responsive to any other set of dial characters. Voltage level generating means are coupled to the receiving means and to the crosspoint matrix and responsive to the control signals for providing transmission path pair voltages having first and second relative voltage magnitudes in response to the first and second sets of control signals respectively. Voltage detecting means are coupled to the transmission path pair of the crosspoint matrix for detecting the relative voltage magnitudes on the transmission path pair and for providing first and second system conditioning signals responsive to the first and second relative voltage magnitudes respectively, the first conditioning signal for activating the audio-video network and the second conditioning signal for activating the audio network. Therefore, the audio-video network is selectively activated when the dial code means generates the unique set of characters and the audio network is selectively activated when the dial code means generates any other set of characters.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
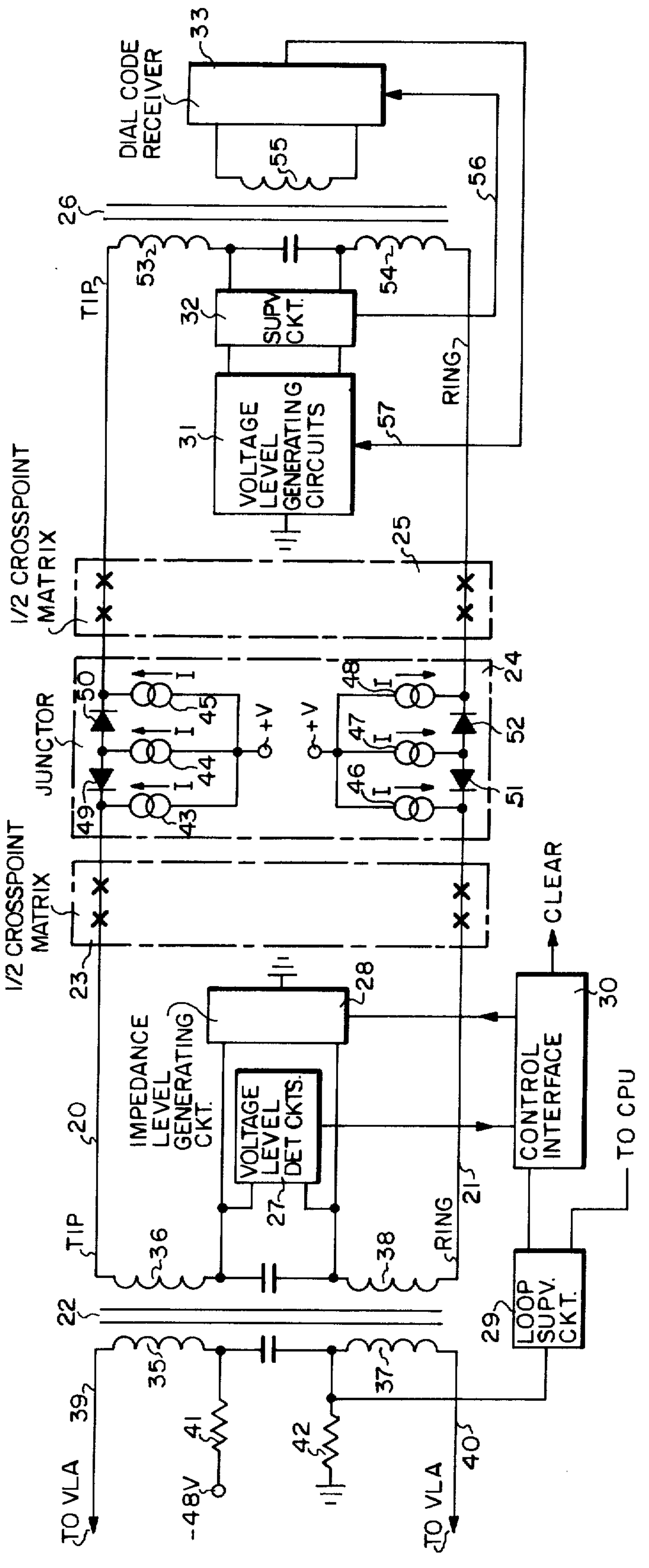
FIG. 1 is a block schematic representation of the audio portion of an audio-video network having a conditioning means embodying the present invention.

Referring now to FIG. 1, the audio portion of the audio-video network thereshown comprises TIP and RING transmission paths 20 and 21, interface coupling transformer 22, crosspoint matrix 23, junctor 24, crosspoint matrix 25 and interface coupling transformer 26. The audio portion additionally comprises voltage detecting means 27, impedance level generating circuit 28, loop supervision circuit 29, control interface 30, voltage level generating means 31, supervision circuit 32 and dial code receiver 33.

Interface coupling transformer 22 comprises windings 35, 36, 37 and 38. Transformer windings 35 and 36 inductively couple the telephone loop connected to line 39 to the TIP transmission path 20. Windings 37 and 38 inductively coupled the telephone loop connected to line 40 to RING transmission path 21. Thus it can be seen that the telephone loop is inductively coupled to the transmission path pair comprising TIP transmission path 20 and RING transmission path 21. Resistors 41 and 42 coupled to windings 35 and 37 respectively provide matching impedances for the telephone set within the telephone loop. The telephone loop is coupled to transformer windings 35 and 37 by lines 39 and 40 respectively via a video line adaptor (VLA) which serves to supervise the operation of the overall telephone system.

Loop supervision circuit 29 is coupled to resistor 42 and is responsive to the on hook or off hook condition of the telephone set coupled to transformer 22. Loop supervision circuit 29 is coupled to control interface circuit 30 which responds to the condition of the loop supervision circuit. It is coupled to impedance level generating circuit 28 which causes current conditions on TIP path 20 and RING path 21 in such a way as to indicate to a calling party the condition of the telephone set coupled to interface transformer 22. Its function will be described in more detail later.

Voltage level detecting means 27 is coupled to windings 36 and 38 of interface transformer 22 and detects the relative magnitudes of the voltages on transmission path 20 and 21. The voltage level detecting means 27 provides conditioning signals in response to the relative magnitudes of the voltages on the tramsmission paths for conditioning either the audio network or the audio-video network of the overall system for carrying the desired form of communication.

Crosspoint switching matrixes 23 and 25 are represented in block form inasmuch as such matrixes are well known in the art. Junctor 24 is coupled in between crosspoint matrix 23 and crosspoint matrix 25 and includes a plurality of current sources 43, 44, 45, 46, 47 and 48 each capable of providing equal amounts of current. As well known, these current sources serve to sustain the operation of the transmission paths during use. Diode 49 is coupled between current source 43 and current source 44 and diode 50 is coupled in between current source 44 and current source 45. These diodes assure that the current from current source 43 is directed towards the transmission path end including transformer 22 and that the current from current source 45 is directed towards the end of the transmission path including transformer 26. In this configuration, it can be understood that the current from current source 44 can pass in either direction. Diodes 51 and 52 serve a like function on the RING side of the network.

Transformer 26 comprising windings 53, 54 and 55 couples the dial code receiving means 33 to the transmission pair. Voltage level generating means 31 is coupled to windings 53 and 54 as shown via the supervision circuit 32. The supervision circuit 32 provides a reset input via line 56 to the dial code receiving means after it has been used.

Dial code receiving means 33 is preferably of the push button multi-frequency type which is well known in the art. It receives the dial codes via the transmission path pair which are generated by the dial code generating means (not shown) of the telephone set located within the telephone loop coupled to interface transformer 22 and provides first and second sets of control signals which are indicative of the type of communication form desired by the calling party. The first and second sets of control signals are coupled via line 57 to voltage level generating circuits 31.

Voltage level generating circuits 31 applies different impedances to the transmission path pair in response to the first and second set of control signals to thereby distribute the amount of current supplied from the current sources in junctor 55 to each end of the transmission path pair.

Briefly, in operation, the dial code receiving means 33 provides its first set of control signals in response to the subscriber dialing a code signal which is indicative of an audio-video call. It is contemplated, that the dial code assigned to an audio-video call is unique in that any other dial code may be utilized for indicating an audio call.

When the subscriber coupled to interface transformer 22 picks up his telephone set and places it off hook, a switch in the telephone set closes and completes a DC path within the telephone loop which is detected by loop supervision circuit 29. Loop supervision circuit 29 and control interface 30 thereby cause impedance level generating circuits 28 to provide a current sink on the transmission path pair while through the action of a central processing unit dial code receiving means 33 is connected to the calling subscriber via the transmission path pair. The dial code receiving means 33 in response to being connected to the originating subscriber by means of voltage level generating means 31 causes currents of the TIP and RING side of the transmission path pair to produce RING and TIP voltages having a relationship indicating that the dial code receiving means is ready to receive the dial codes provided by the dial code generating means in the telephone loop.

If the subscriber is desirous of placing an audio-video call, when he dials the unique dial code, it is received by dial code receiving means 33 which produces the first set of control signals responsive to the unique dial code. The first set of control signals is transmitted via line 57 to voltage level generating means 31 which distributes RING and TIP currents to flow in the transmission path pair causing RING and TIP voltages having relative magnitudes just the reverse of the relative magnitudes it produced to indicate the ready condition of the dial code receiving means 33. Because the currents drawn by the voltage level generating means 31 in the TIP and RING transmission path are unequal, the current drawn by the level generating circuit 28 which is coupled to interface transformer 22 will also be unequal. The relative magnitudes of the TIP and RING voltages at the end of the transmission path pair including transformer 22 will be just the reverse of the relationship at the other end of the transmission path pair. The voltage imbalance on the TIP and RING transmission path is detected by voltage level detecting means 27 which provides a first conditioning signal which is utilized by the telephone system to condition the audio-video network for carrying the audio-video call to be placed by the subscriber.

If the subscriber were to have placed an audio call, he would dial a dial code other than the unique dial code which is detected by dial code receiving means 33 which produces a second set of control signals which are transmitted to the voltage level generating circuits 31 via line 57. The second set of control signals cause the voltage level generating means 31 to disconnect dial code receiving means 33 from the transmission path pair and as a result to provide equal TIP and RING voltages at transformer 22, which equality is detected by the voltage detecting means 27 to provide a second conditioning signal to be utilized by the system for conditioning the audio network for carrying the audio call to be placed by the subscriber.

It is contemplated that only one dial signal digit be required for indicating the form of communication desired by the subscriber. It may preferably be the number sign which appears on most every touch code telephone and would represent the unique dial signal indicating an audio-video call.

Figure 2A:
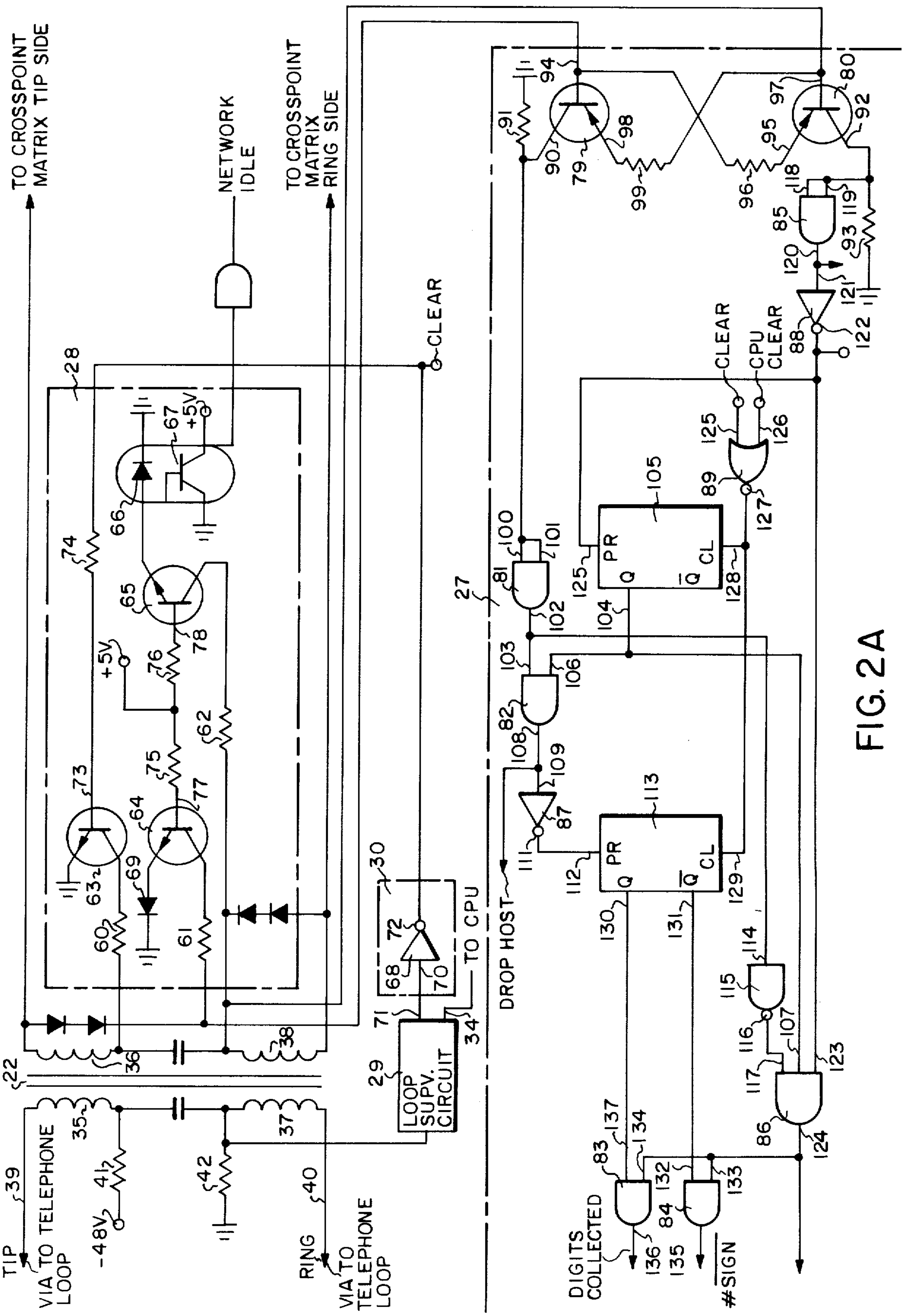
FIG. 2 is a more detailed schematic circuit diagram partially in block form of the audio portion of the audio-video network including a conditioning means embodying the present invention.
Figure 2B:
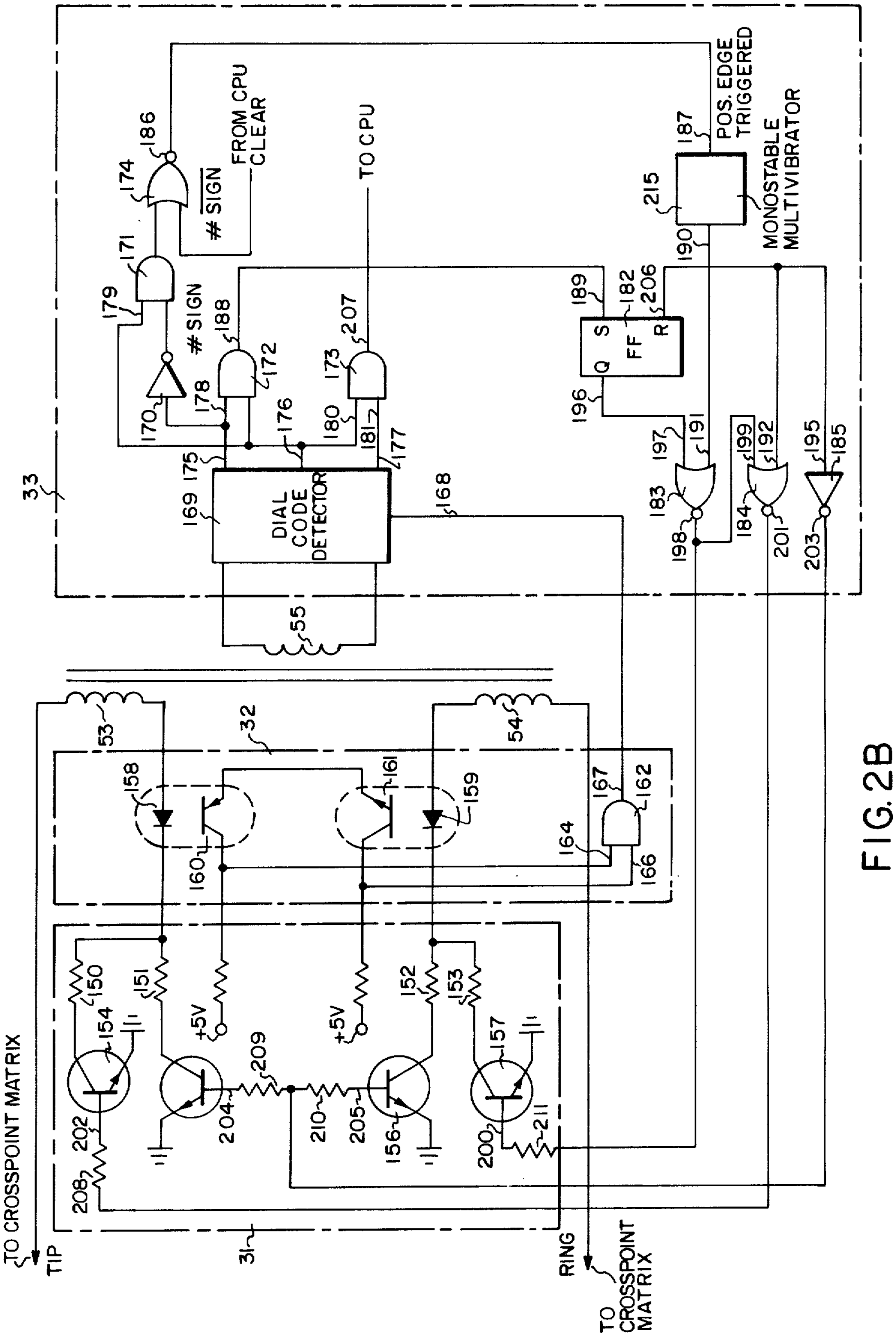

The network of FIG. 1 is shown in more detail in FIG. 2 with the crosspoint matrixes and junctor omitted. To the extent that the figures are identical, the reference numerals have been duplicated.

The impedance level generating circuit 28 comprises resistors 60, 61 and 62 and transistors 63, 64 and 65. Resistor 60 is coupled from winding 36 to ground through transistor 63. Resistor 61 is also coupled to winding 36 of transformer 22 to ground through transistor 64 and diode 69, and resistor 62 is coupled to ground from winding 38 through transistor 65 and light emitting diode 66. Light emitting diode 66 has in conjunction with it light sensitive transistor 67.

Control interface 30 comprises inverter 68. Input 70 of inverter 68 is coupled to the output 71 of loop supervision circuit 29. The output 72 of inverter 68 is coupled to the base 73 of transistor 63 via resistor 74. Base 77 of transistor 64 and base 78 of transistor 65 are coupled to a positive voltage source via resistors 75 and 76 respectively.

Voltage level detecting means 27 comprises transistors 79 and 80, AND gates 81, 82, 83, 84, 85, and 86, inverters 87 and 88, NOR gate 89 and flip-flops 105 and 113.

The collector 90 of transistor 79 is coupled to ground via resistor 91 and the collector 92 of transistor 80 is coupled to ground via resistor 93. The base 94 of transistor 79 is coupled to the emitter 95 of transistor 80 via resistor 96 and the base 97 of transistor 80 is coupled to the emitter 98 of transistor 79 via resistor 99. Base 94 of transistor 79 is coupled to winding 36 of transformer 22 to sense the DC current on transmission path 20. Base 97 of transistor 80 is coupled to winding 38 of transformer 22 to sense the magnitude of the DC current on transmission path 21.

Transistors 79 and 80, by being in the circuit configuration as just described, are configured to detect current imbalance on the transmission path pair to thereby detect the relative current magnitudes of the currents on transmission paths 20 and 21.

Collector 90 of transistor 79 is coupled to inputs 100, 101 of AND gate 81. Output 102 of AND gate 81 is coupled to input 103 of AND gate 82. AND gate 81 therefore serves as a buffer driver between collector 90 and input 103 of AND gate 82.

Q output 104 of flip-flop 105 is coupled to the other input 106 of AND gate 82 and also to input 107 of AND gate 86. Output 108 of AND gate 82 is coupled to input 109 of inverter 87 and also to the host office via line 110 which processes the normal audio calls. Output 111 of inverter 87 is coupled to preset input 112 of flip-flop 113.

Output 102 of AND gate 81 is also coupled to input 114 of NAND gate 115 which is an output 116 coupled to input 117 of AND gate 86.

Collector 92 of transistor 80 is coupled to inputs 118 and 119 of AND gate 85. Output 120 of AND gate 85 is coupled to input 121 of inverter 88 and also to the central processing unit to provide a signal that the dial code receiving means 33 has been seized by the transmission path pair. Output 120 of AND gate 85 is also coupled to input 121 of inverter 88. Output 122 of inverter 88 is coupled to preset input 125 of flip-flop 105 and also to input 123 of AND gate 86. Output 124 of AND gate 86 is coupled to the central processing unit to designate when the dial code receiving means has been disconnected from the transmission path pair.

NOR gate 89 has input 125 coupled to the output of inverter 72 and input 126 coupled to the central processing unit for receiving a signal indicating that a call has been completed and that the current level detecting means may be cleared to once again be used. Output 127 of NOR gate 89 is coupled to clear input 128 of flip-flop 105 and also to clear input 129 of flip-flop 113. Q output 130 of flip-flop 113 is coupled to input 137 of AND gate 83. Q output 131 of flip-flop 113 is coupled to input 132 of AND gate 84. Input 133 of AND gate 84 is coupled to output 124 of AND gate 86. Input 133 is also coupled to input 134 of AND gate 83. Output 135 of AND gate 84 is coupled to the central processing unit for conditioning the audio network when the call dialed by the subscriber is not an audio-video call. Output 136 of AND gate 83 is also coupled to the central processing unit and signifies when a complete dial code signal has been completed.

Voltage level generating means 31 comprises resistors 150, 151, 152, 208, 209, 210, 211 and 153. It also comprises transistors 154, 155, 156 and 157. Resistor 150 is coupled to winding 53 via light emitting diode 158 and also to ground via transistor 154. Resistor 151 is also coupled to winding 53 via diode 158 and is also coupled to ground through transistor 155. Resistor 152 is coupled to winding 54 via light emitting diode 159 and to ground through transistor 156. Resistor 153 is coupled from winding 54 to ground through diode 159 and transistor 157. As shown, the emitters of transistors 154, 155, 156 and 157 are all coupled to ground.

Supervision circuit 32 in addition to light emitting diodes 158 and 159, comprises light sensitive transistors 160 and 161 and AND gate 162. The collector 163 of transistor 160 is coupled to input 164 of ANd gate 162 and collector 165 of transistor 161 is coupled to input 166 of AND gate 162. Output 167 of AND gate 162 is coupled via line 168 to the dial code receiving means 33.

Dial code receiving means 33 comprises dial code detector 169, inverter 170, AND gate 171, AND gate 172, AND gate 173, and OR gate 174. The detector has outputs 175, 176 and 177. Output 175 is coupled to input 178 of AND gate 172 and to inverter 170. Output 176 is coupled to input 179 of AND gate 171 and to input 180 of AND gate 173. Output 177 is coupled to input 181 of AND gate 173. The outputs of AND gate 171 is coupled to one input of OR gate 174 while the output of AND gate 173 is brought out to supply the central processing unit with logical information. The other input of OR gate 174 is brought out to allow the central processing unit to clear the receiver.

The dial code receiving means 33 also comprises monostable multivibrator 181, flip-flop 182, NOR gate 183, NOR gate 184 and inverter 185. Output 186 of OR gate 174 is coupled to input 187 of monostable multivibrator 181. Output 188 of AND gate 172 is coupled to set input 189 of flip-flop 182. Output 190 of monostable multivibrator 187 is coupled to input 191 of NOR gate 183, input 192 of NOR gate 184 and input 195 of inverter 185. Q output 196 of flip-flop 182 is coupled to input 197 of NOR gate 183. Output 198 of NOR gate 183 is coupled to input 199 of NOR gate 184 and also via resistor 211 to base 200 of transistor 157. Output 201 of NOR gate 184 is coupled via resistor to base 202 of transistor 154 and output 203 of inverter 195 is coupled via resistors 209 and 210 to bases 204 and 205 of transistors 155 and 156 respectively.

In operation, assuming that the telephone set within the transmission loop including lines 39 and 40 is on hook, there will be no DC current path established within the transmission loop. In response to the lack of the current path, loop supervision circuit at its output 71 will provide a logical 0 which is transmitted to input 70 of inverter 68 and input 74 of OR gate 69. Inverter 68 in response to the logical 0 at its input produces at output 72 a logical 0 at its input produces at output 72 a logical 1 which is impressed upon base 73 of transistor 63. Because a logical 1 is permanently impressed upon bases 77 and 78 of transistors 64 and 65, transistors 63, 64 and 65 will all be conductive.

Assuming that resistors 60, 61 and 62 are all of equal value, 1500 ohms for example, there will be 750 ohms at TIP winding 36 of interface transformer 22 which is the combination of the parallel resistances of resistors 60 and 61. At winding 38 there will be 1500 ohms to ground. The unequal resistances at the TIP and RING side indicate to a possible calling subscriber that the telephone set coupled to lines 39 and 40 is on hook and ready to receive a call.

When the telephone set goes off hook, a current path will be established within the loop, the current path extending from ground, through resistor 42, winding 37, line 40 into the telephone loop, out of the telephone loop at line 39, through winding 35, resistor 41 and to the –48 volt supply. The current path established within the loop causes loop supervision circuit 29 to produce at its output 71 a logical 1 which is impressed upon input 70 of inverter 68. Inverter 68 therefore, at its output 72 will provide a logical 0 which is coupled to base 63 of transistor 73 turning transistor 73 off, while transistors 64 and 65 remain conductive. Therefore, in the off hook condition, there will be 1500 ohms at each of the TIP and RING transmission paths.

In addition to the logical 1 at output 71 of loop supervision circuit 29, a logical 1 will also be provided at output 34 which is coupled to the Central Processing Unit of the telephone system to indicate that an available dial code receiver should be connected.

After being pulled onto the transmission path pair 20, 21 the dial code receiver 33 is readied to receive the dial code. Monostable multivibrator 181 is of the type which is normally a logical 0 at output 190. A logical 0 is impressed upon input 191 of NOR gate 183, input 192 of NOR gate 184, input 195 of inverter 185, and the R input 206 of flip-flop 182.

Flip-flop 182 in response to the logical 0 at input 206 will produce a logical 0 at Q output 196 which is impressed upon input 197 of NOR gate 183. NOR gate 183 in response to the logical 0 signals at its inputs will produce a logical 1 at output 198 which is impressed upon base 200 of transistor 157 and also upon input 199 of NOR gate 184.

NOR gate 184 in response to the logical 1 at input 199 will produce a logical 0 at output 201 which is impressed upon base 202 of transistor 154 turning transistor 154 off. Lastly, the zero input at input 195 of inverter 185 will cause a logical 1 to be produced at output 203 which is impressed upon bases 204 and 205 of transistors 155 and 156 respectively turning those transistors on. In this condition, transistor 154 is off and transistors 155, 156 and 157 are on. Assuming that resistors 150, 151, 152 and 153 are of equal resistances, for example 1500 ohms, with transistors 156 and 157 conducting, resistors 152 and 153 will be in parallel presenting a resistance of 750 ohms at the RING side of the transmission pair. With transistor 154 off and 155 conductive, only resistor 151 will be coupled between winding 53 and ground thus presenting 1500 ohms to the TIP side of the transmission path pair. With 1500 ohms at the TIP side and 750 ohms at the RING side, the transmission path at the RING side will sink more current than the transmission path at the TIP side.

Referring to FIG. 1 and remembering that the junctor current sources produce currents of equal mangitude (I), voltage generating circuit 31 distributes the generator current so that the current at the TIP side will be 1.5I and the current drawn by impedance level generating circuit 28 at the TIP side will also be 1.5I totaling the 3I available from current sources 43, 44 and 45. The RING side of voltage level generating circuit 31 however will sink an amount of current equal to 2I and the impedance level generating circuit 28 at the RING side will sink current equal to I. This totals the 3I available from current sources 46, 47 and 48.

As can be seen, the TIP side 20 of the transmission path pair will therefore conduct current equal to 1.5I and the RING side 21 will conduct current equal to I. Because transformer 22 has equal impedance at its TIP and RING side, the voltage at the TIP side will be greater than the voltage at the RING side.

Voltage level detecting means 27 at transistors 79 and 80 detects the relative magnitudes of the voltages at lines 20 and 21. Because base 94 of transistor 79 is coupled to the TIP side of the transmission path pair, and because base 97 of transistor 80 is coupled to the RING, transistor 79 will turn off and transistor 80 will turn on because transistor 80 will be forward biased and transistor 79 will be back biased.

Transistor 80 by being conductive will produce at its collector 92 a logical 1 output which is impressed upon inputs 118 and 119 of AND gate 85. AND gate 85 at output 120 will produce a logical 1 which is coupled to input 121 of inverter 88. Inverter 88 in response will provide a logical 0 at output 122 which is coupled to preset input 125 of flip-flop 105 setting Q output 104 at the logical 1 level. At the point a dial tone will be sent to the calling party indicating that the dial code receiver 33 is ready to receive the dial code provided by the dial code generating means within the telephone loop.

Assuming that the subscriber requires audio-video communication, the first dial code digit produced by the dial code generating means in the telephone set will be the unique dial code indicative of the audio-video communication. Of course, the subscriber will dial the complete code, but the first digit of the dial code will contain the unique dial character.

The dial code receiver 33 receives the dial codes over transmission path pair 20 and 21. Upon receipt of the unique dial code the dial code receiver 33 will produce at outputs 175, 176 and 177 a set of logic levels to produce a logical 1 output at output 188 of AND gate 172. The logical 1 output at output 188 is impressed upon set input 189 of flip-flop 182 which causes the Q output 196 to assume the logical 1 state. The logical 1 state at Q output 196 is impressed upon input 197 of NOR gate 183. Monostable 181 still produces at output 190 a logical 0 which is impressed upon R input 206 of flip-flop 182, input 191 of NAND gate 183, input 192 of NOR gate 184 and input 195 of inverter 185. NOR gate 183 will therefore provide at output 198 a logical 0, NOR gate 184 will provide at output 201 a logical 1, and inverter 185 will provide at output 203 a logical 1, the logic signals at each of the outputs 198, 201 and 203 forming a first set of control signals.

The logical 0 output at output 198 is impressed upon base 200 of transistor 157, the logical 1 output at output 201 is impressed upon base 202 of transistor 154, and the logical 1 output of inverter 185 is impressed upon bases 204 and 205 of transistors 155 and 156 respectively. Therefore, transistors 154, 155 and 156 are on and transistor 157 is off thereby providing a current path to ground through resistors 150 and 151 at the TIP side and resistor 152 at the RING side. Therefore, there will be 750 ohms between winding 53 and ground on the TIP side and 1500 ohms between winding 54 and ground on the RING side.

Remembering that the transmission path pair at interface transformer 22 has 1500 ohms to ground at both the TIP and RING side, the 750 ohms at the TIP side and 1500 ohms at the RING side at interface transformer 26 causes the current sources to provide a greater amount of current to the voltage level generating means 31 on the TIP side than on the RING side. As a consequence, a current equal to 1.5I will flow through winding 38 on transmission path 21 and a current equal to I will flow through winding 36 on transmission path 20. Therefore, the voltage at winding 38 will be greater than the voltage at winding 36 and are of first relative magnitudes.

The relative voltage magnitudes are detected by voltage detecting means 27 at transistors 79 and 80. Because the voltage at the TIP side 20 is of greater value than the voltage at the RING side, transistor 79 will turn on and transistor 80 will turn off. Collector 90 of transistor 79 will therefore assume the logical 1 state which is impressed upon inputs 100 and 101 of AND gate 81. AND gate 81 will therefore produce at output 102 a logical 1 which is impressed upon input 103 of AND gate 82. Input 106 of AND gate 82 already has a logical 1 from Q output 104 of flip-flop 105 and therefore AND gate 82 will produce at output 108 a logical 1 which is transmitted to the host office via line 110 to indicate that the host office normally used for carrying the standard audio communication may be dropped. The logical 1 at output 108 can therefore be considered a first conditioning signal for conditioning the audio-video network to carry the audio-video communication desired by the subscriber. The logical 1 at output 108 will produce a 1 at input 109 of inverter 87 which produces a logical 0 at output 111 and the preset input 112 of flip-flop 130. As a result, flip-flop output 130 will go to the "1" state and 131 will go to the "0" state.

Assuming that the subscriber originally desired to place an audio call, he would dial a dial code consisting of characters other than the unique code which is received by dial code receiver 33 over the transmission pair 20 and 21. The dial code receiver 33 in response to the dial code provides outputs at outputs 175, 176 and 177 to cause OR gate 174 at output 186 to provide a logical 1 to input 187 of monostable multivibrator 181. This causes output 190 of monostable multivibrator 181 to temporarily assume the logical 1 state. This logical 1 state is impressed upon reset input of flip-flop 182, input 191 of NOR gate 183, input 192 of NOR gate 184 and input 195 of inverter 185. In response to the logical 1 levels at inputs 191, 192 and 195, a logical 0 will be produced at outputs 198, 201 and 203 of NOR gate 183, NOR gate 184 and inverter 185 respectively. These logical 0 levels constitute the second set of control signals which are impressed upon bases 202, 204, 205 and 200 of transistors 154, 155, 156 and 157 respectively turning these transistors off. Therefore, the current path to ground for windings 53 and 54 is disrupted causing an infinite impedance on the TIP and RING side of the transmission path pair at interface transformer 26 and disconnecting dial code receiver 33 from the line.

Because of the infinite impedance at both the TIP and RING side at interface transformer 26, the current sources in the junctor will be caused to supply an equal amount of current equal to 2I in both the TIP and RING transmission paths 20 and 21 to impedance level generating circuit 28. The currents in transmission path 20 and 21 produce equal voltage at windings 36 and 38 and are therefore of second relative magnitudes.

The equal voltages on transmission paths 20 and 21 are detected by the voltage level detecting means 27 at transistors 79 and 80, the equal voltages causing both transistors 79 and 80 to turn off. Therefore, a logical 0 results at both collector 90 of transistor 79 and collector 92 of transistor 80.

The logical 0 at collector 90 is impressed upon inputs 100 and 101 of AND gate 81 which produces a logical 0 responsive thereto at its output 102. The logical 0 at output 102 is impressed upon input 103 of AND gate 82 and input 114 of NAND gate 115.

The logical 0 at collector 92 is impressed upon inputs 118 and 119 of AND gate 85 which produces a logical 0 at its output 120 which is impressed upon input 121 of inverter 88. Inverter 88 therefore produces a logical 1 at its output 122 which is communicated to input 123 of AND gate 86.

AND gate 82 having a 0 at input 103 provides a logical 0 at output 108 which tells the host office not to drop off since it is a standard audio call. Output 131 of flip-flop 113 which is still in the reset state is in the logical 1 state which is impressed upon input 132 of AND gate 84. The logical 0 at output 102 of AND gate 81 by being applied to input 114 of NAND gate 115 causes NAND gate 115 to provide at output 116 a logical 1 which is impressed upon input 107 of AND gate 86. Because output 104 of flip-flop 105 is at the logical 1 level which is impressed upon input 107 of AND gate 86, all inputs 117, 107 and 123 of AND gate 86 are at the logical 1 level causing AND gate 86 to provide at output 124 a logical 1 level which is used to provide a signal to disconnect dial code receiver 33 and also is impressed upon input 133 of AND gate 84.

AND gate 84 and AND gate 86 therefore provide logical 1s at their outputs 135 and 124 respectively, the output at output 135 signifying that the dial code dialed by the subscriber was a dial code other than the unique dial code to thereby provide a second conditioning signal for the telephone system to cause the standard audio network to be conditioned to carry the audio communication. As previously mentioned, the output 124 is utilized to inform the central processing unit that the dial code receiver 33 has been disconnected.

The central processing unit will subsequently provide an input to input 126 of NOR gate 89 to cause output 127 to provide a clear input signal for inputs 128 of flip-flop 105 and input 129 of flip-flop 113 to reset flip-flop 105 (flip-flop 130 had never been set) to condition the voltage detecting means 27 for future use.

Recalling that transistors 154, 155, 156 and 157 were turned off when the dial code generated by the dial code generating means was a dial code other than the unique dial code, an infinite impedance was created at windings 53 and 54 of interface transformer 26. Because the current paths at windings 53 and 54 were disrupted, the light emitting diodes 158 and 159 were caused to be turned off which condition was sensed by light sensitive transistors 160 and 161 which provided suitable inputs to AND gate 162 to cause dial code receiving means to receive via line 168 a signal for conditioning the dial code receiver 33 for future use.

Referring now to the case wherein the subscriber has dialed the unique dial code signal to indicate that an audio-video call is being placed and recalling that the system responds to the first unique digit to condition the audio-video network to carry the audio-video communication, the present invention also provides a means for disconnecting dial code receiver 33 after the complete dial code signal has been dialed. After the dial code signal is completed, dial code receiver 33 provides at output 207 of NAND gate 173 a logical 1 signal to inform the central processing unit. The central processing unit will take the dial information from the receiver and subsequently provide a clear signal at the input of OR gate 174. This causes the system to react as in the case of an audio call. Voltage level generating circuit 31 will provide an infinite impedance on the transmission path pair to thereby disconnect dial code receiver 33 from the transmission path pair.

Transmission paths 20 and 21 will have equal voltages which are detected by the voltage detecting means 27 which provides in response thereto at output 136 of AND gate 83 a logical 1 signal to indicate that all of the dial digits have been collected. The dial code receiver 33 is conditioned by supervision circuit 32 to stand ready for future use and the voltage detecting means flip-flops 105 and 113 are reset by clear signals from the central processing unit at input 126 of NOR gate 89 as previously described.

Lastly, should the subscriber at any time place his receiver on hook, loop supervision circuit 29 provides a logical 0 at output 71 to cause inverter 68 to provide a clear signal at output 72 for clearing the current detector 27.

Therefore, it can be seen that the present invention provides a system for carrying two different forms of communication over two separate networks of the telephone system wherein the system includes a means for conditioning the desired network to carry the desired form of communication. The conditioning is done automatically in response to the dial codes generated by a dial code generating means and additionally includes means for resetting itself after its use has been terminated.

While the preferred embodiment of the present invention has been described in a telephone communication system atmosphere, it of course can be appreciated that the present invention can be utilized in any communication system wherein alternate forms of communication are necessary and wherein the system operates in response to a dial code generated by a dial code means for carrying the desired form of communication.

While a particular embodiment of the invention has been shown and described, modifications may be made, and it is intended in the appended claims to cover all such modifications as may fall within the true spirit and scope of the invention.

We claim:

1. In a telephone system of the type which provides for both audio or audio-video communication, wherein the system has an audio-video network including an audio crosspoint switching matrix for carrying the audio portion of the audio-video communication, the matrix having current sources for sustaining a transmission path pair between any two endpoints of the system, an audio network for carrying the audio communication and dial code means coupled to at least one end of the crosspoint matrix for generating dial codes, the dial codes for the audio-video communication including a unique set of characters, the improvement of a means for conditioning the system for either audio or audio-video communication in response to the dial codes comprising:

dial code receiving means coupled to the other end of said crosspoint switching matrix and responsive to the dial codes generated by the dial code means, said receiving means providing a first set of control signals in response to said unique set of characters and providing a second set of control signals responsive to any other set of dial characters;

voltage level generating means coupled to said receiving means and to said crosspoint matrix and responsive to said control signals for providing transmission path pair voltages having first and second relative voltage magnitudes in response to said first and second sets of control signals respectively; and voltage detecting means coupled to the transmission path pair of the crosspoint matrix for detecting the relative voltage magnitudes on the transmission path pair and for providing first and second system conditioning signals responsive to said first and second relative voltage magnitudes respectively, wherein said transmission path voltages are either unequal corresponding to first relative current magnitudes in said transmission path caused by said voltage level generating means or said transmission path voltages are equal corresponding to second relative current magnitudes in said transmission path caused by said voltage level generating means, said first conditioning signal for activating said audio-video network and said second conditioning signal for activating said audio network;

whereby, said audio-video network is selectively activated when said dial code means generates said unique set of characters and said audio network is selectively activated when said dial code means generates any other set of characters.

2. A system in accordance with claim 1 wherein said voltage level generating means comprises a first plurality of impedances coupled to one said transmission path and a second plurality of impedances coupled to the other said transmission path and wherein each said impedance is associated with a respective given switch for selectively coupling said impedances to a common reference potential in response to said first and second sets of control signals for causing the current from said current sources to be distributed on said transmission path pair to provide said transmission path with voltages having said first and second relative current magnitudes.

3. A system in accordance with claim 2 wherein each of said first and second plurality of impedances comprise two impedances and wherein said common reference potential is ground potential.

4. A system in accordance with claim 1 wherein said voltage detecting means comprises first and second mutually coupled transistors, said first transistor being coupled to one said transmission path and said second transistor being coupled to the other said transmission path.

5. A system in accordance with claim 4 wherein only one said transistor is conductive in response to said first relative voltage magnitudes and wherein both said transistors are nonconductive in response to said second relative voltage magnitudes.

6. A system in accordance with claim 1 wherein said voltage level generating means disconnects said dial code receiving means from said transmission path pair in response to said second set of control signals.

7. A system in accordance with claim 6 wherein said dial code receiving means is responsive to the completion of said unique dial code for providing said second set of control signals after said unique dial code is completed.

* * * * *